United States Patent [19]
Gauthier

[11] 4,148,559
[45] Apr. 10, 1979

[54] METHOD AND DEVICE FOR CONNECTING OPTICAL FIBRES

[75] Inventor: Francis Gauthier, Oullins, France

[73] Assignee: Societe Anonyme Dite: Les Cables de Lyon, Lyons, France

[21] Appl. No.: 838,231

[22] Filed: Sep. 30, 1977

[30] Foreign Application Priority Data

Oct. 5, 1976 [FR] France .................. 76 29891

[51] Int. Cl.² ............................................. G02B 5/14
[52] U.S. Cl. ................................................ 350/96.21
[58] Field of Search ............... 350/96.21, 96.20, 96.22

[56] References Cited

U.S. PATENT DOCUMENTS

| | | | |
|---|---|---|---|
| 3,871,744 | 3/1975 | Bridger et al. | 350/96.21 |
| 3,885,859 | 5/1975 | Dalgleish et al. | 350/96.21 |
| 3,912,574 | 10/1975 | Cherin et al. | 350/96.21 |
| 4,045,121 | 8/1977 | Clark | 350/96.21 |

FOREIGN PATENT DOCUMENTS

| | | | |
|---|---|---|---|
| 2518319 | 7/1976 | Fed. Rep. of Germany | 350/96.21 |
| 1447317 | 8/1976 | United Kingdom | 350/96.21 |

OTHER PUBLICATIONS

Thiel et al., "Optical Waveguide Cable Connection," *Applied Optics*, vol. 15, No. 11, Nov. 1976, pp. 2785-2791.

Primary Examiner—John K. Corbin
Assistant Examiner—Stewart Levy
Attorney, Agent, or Firm—Haseltine, Lake & Waters

[57] ABSTRACT

A device for connecting optical fibres comprises two identical units fitted to the respective ends to be joined. Each unit has an alinement structure in which the end portion of the fibre is held resiliently by a bend in the fibre leading to the clamp. The units are mated with their alinement structures alined and face to face with their respective fibre end portions meeting end to end substantially half way along the alinement structures.

11 Claims, 6 Drawing Figures

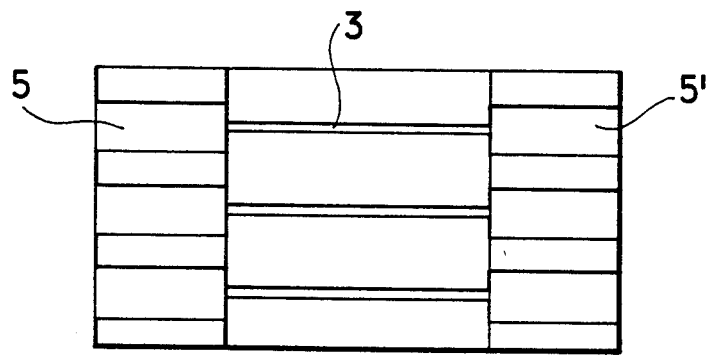
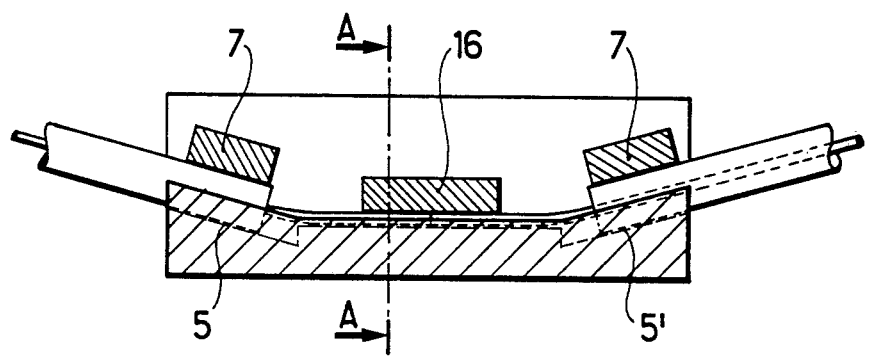
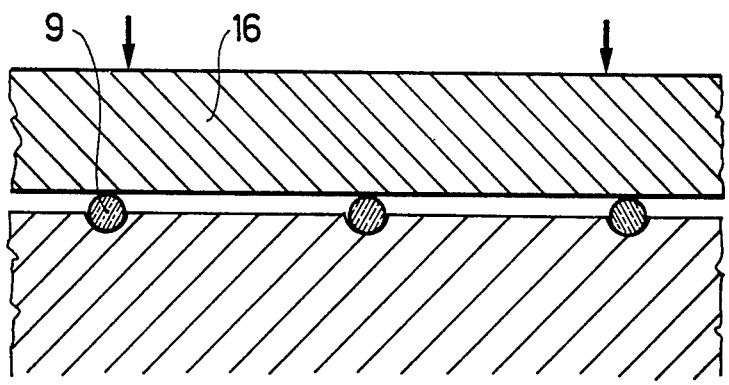

METHOD AND DEVICE FOR CONNECTING OPTICAL FIBRES

The present invention relates to a method and a device for connecting optical fibres end-to-end to form a splice or a connector with low attenuation, which is useful in systems for transmitting data by optical means.

To form the low attenuation connections which are necessary for good performance of such systems, difficulties connected with the laws of optical geometry must be overcome:

axial alinement of the two fibres;

perpendicularity to this same axis of end-to-end sections which are face to face - parallelism of these two faces;

transmission of light from one fibre into the other either by placing them in very pure air close to each other and possibly by making them touch, or by adding between the two surfaces a medium with an identical refractive index forming a physical and optical continuity.

Numerous systems are known for alining two cylinders of identical diameter—a V, a semi-cylindrical trough, a duct defined by three cylinders longitudinally tangential in pairs, etc.—which all use the principle of alinement by pressing and referencing on the generators of the surfaces of the cylinders to be alined.

A method is also known from the Post Office's British patent specification No. 1 447 317 for coupling optical fibres having an angle between their alinement axis and means for holding the stripped portion of the fibres.

A previously used example of this method consists in machining two v-shaped grooves along a single rectilinear axis in a substrate, the first to receive therein the covered fibre, the second to receive therein the end of the stripped fibre.

Two fibres are placed facing each other and are brought into contact with each other and the assembly is clamped in an appropriate device.

This method has the disadvantage that it is difficult to machine two V's of different depths which are perfectly alined.

Further, the fibres do not have protective coverings of very constant diameters and this provokes misalinements and bends in the fibre, leading to an increase in attenuation and even causing the fibre to break at the time of clamping.

The device according to the present invention overcomes this disadvantage, since the fibre no longer risks bending due to the variations in diameter of the covering.

Furthermore, the positioning of the bare fibre in its alinement groove—V or semi-cylindrical trough—is easily done by hand, without resorting to sophisticated methods or devices.

It makes it possible to form both splices, i.e. permanent connections, or connectors, i.e. junctions which can be undone starting from the same alinement principle and device.

The present invention provides a device for connecting optical fibres, said fibres having a protective covering the device comprising a connection element for each fibre end, said connection element having a first rectilinear alinement structure for an end portion of its fibre and a second rectilinear alinement structure for a portion of the fibre adjacent the end portion, the axes of the alinement structures being in the same plane and at an angle of a few tens of degrees to each other such that when the optical fibre held on the second rectilinear alinement structure its end portion is held in the first rectilinear alinement structure by a resilient bend of a few tens of degrees in a length of the fibre extending between the alinement structures, wherein the connection elements of two fibre ends to be connected are identical and connection is performed by superposing the connection elements with their first alinement structures face to face and in alinement with the end portions of the fibres extending substantially half way along their respective first alinement structures.

The present invention also provides a connector comprising a plurality of the connection devices.

The present invention further provides a method of connecting optical fibres, each of the fibres being provided with a covering except for a stripped end portion, comprising the step of placing the stripped end and the covered part of each envisaged fibre in position in respective alinement structures by bending and sliding, a bend being provided for both the covered part and the stripped part of said fibre thus allowing said sliding, the stripped end being advanced only up to half way along its alinement structure, and means being used for stopping the movement of the stripped end at the end of the sliding operation.

Embodiments of the invention are described below by way of example with reference to any in the accompanying drawings in which:

FIG. 4 shows a top view of a variant of a connector;

FIG. 5 shows an elevation view of a cross-section of the same variant of a connector; and FIG. 6 shows a cross-section along A-A of FIG. 5 of the same variant of a connector.

Figure 1:
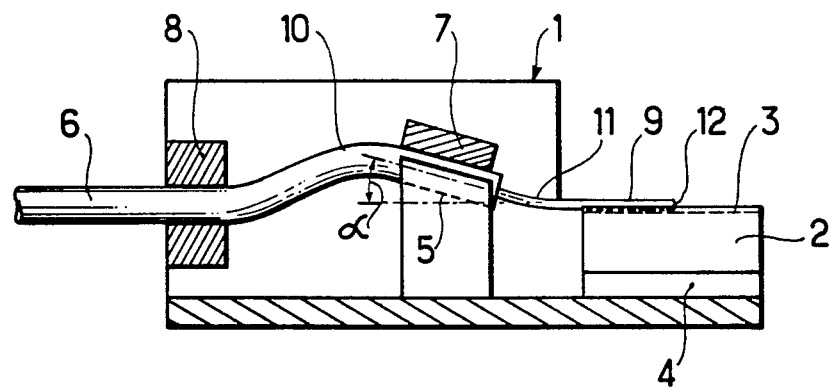
FIG. 1 shows an elevation view of a cross section of a portion of a connection device.

FIG. 1 shows a portion of a connection device constituted in a staircase configuration in which the lower part includes a movable part 2 made of silica glass or the like obtained by pressure die casting according to glass making techniques known per se. This part 2 can also be a machinable metal or a machinable ceramic substance. The movable part 2 has an accurately machined groove 3 which can be V shaped or half cylindrical.

The movable part 2 is integral with a play compensating device 4 which can be made of an elastomer. The top part of the staircase contains a V-shaped or semi-cylindrical trough 5 which forms an angle α with the groove 3, where α lies between a few degrees and a few tens of degrees.

The covered fibre 6 is held at the level of the trough 5 by a pressing device 7. A cable clamp 8 fixes the covered fibre 6 for easy handling of the covered fibre in the trough 5 and the stripped fibre 9 in the groove 3. The covered fibre 6 follows a bend 10 before entering the trough 5 and the stripped fibre 9 has a small bend 11 before being engaged in the groove 3. The stripped fibre 9 is held in the groove 3 under the effect of stresses due to the curving in the bend 11. The end 12 of the fibre 9 is positioned by sliding the fibre. The slack can be taken up by sliding the bend 11 or by sliding the covered fibre in the trough 5, or by a combination of the two sliding movements. The cross-section of the bare fibre is situated in the connection position 12.

Figure 2:
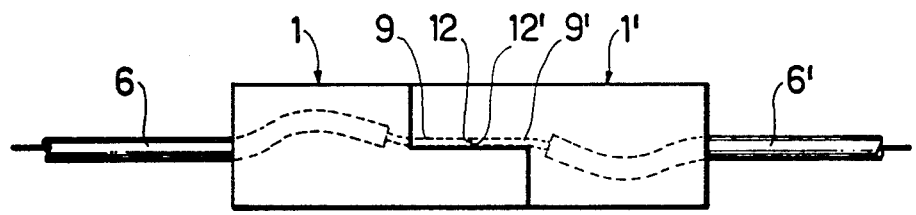
FIG. 2 shows an assembled connection device.

FIG. 2 shows the connection of two portions 1 and 1', the portion 1' being perfectly identical to the portion 1 and being superposed on the lower part of the portion 1 after rotation through 180°. The stripped fibres 9 and 9' from the protected fibres 6 and 6' are then facing each other and the cross-sections 12 and 12' are in contact with each other.

Thus a connector is obtained, the two portions being fixed together yet remaining detachable. Also two cables of any internal structure can be spliced by spreading out the fibres and by permanently fixing together the two connector portions 1 and 1'.

The alinement of the stripped fibres such as 9 is obtained by simultaneous pressure on the two movable parts 2, on the two fibres to be connected under the effect of the play compensating devices 4.

In the case of a cable having several fibres, the movable part 2 can have several parallel grooves such as 3 for connecting fibres.

Figure 3:
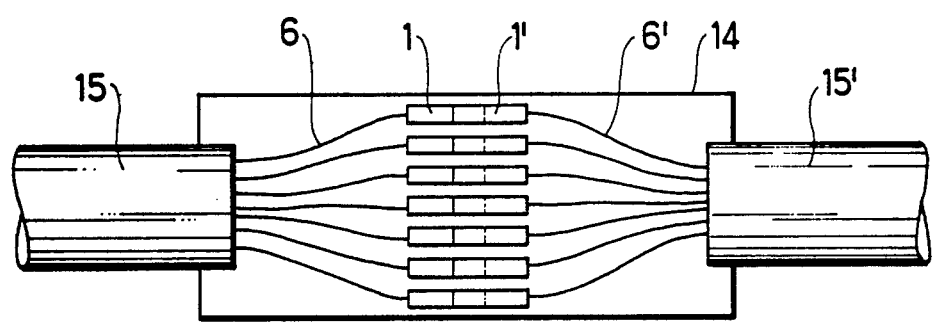
FIG. 3 shows a top view of a connector formed by a group of connection devices.

FIG. 3 shows a group of connectors such as 1, and 1' inside a protective casing 14.

The cables 15 and 15' comprise covered fibres such as 6 and 6' which are spread out and each of which enters into elementary connectors such as 1 and 1'. Thus a modular group of connectors is obtained. This modular principle allows for adaptation to numerous types of cable.

FIGS. 4, 5 and 6 show a variant of the connection device constituted by a single support on which two troughs 5 and 5' supporting the covered fibres are disposed on either side of a groove 3 supporting the stripped fibres. It is evidently possible to multiply the number of connections for a single support. A pressure element 16 presses on the fibres such as 9 and can be permanently fixed by welding, gluing or any other means to protect the joints of the splice thus formed. It can also be movable and have a modular structure to make the joints independent and the connections detachable.

The device for connecting optical fibres according to the present invention makes it possible to form low attenuation joints between optical fibres by means of a connector or by splicing.

The field of application covers optical fibres for telecommunications.

What we claim is:

1. A device for connecting optical fibers, said fibers having a protective covering, the device comprising identical connection elements for each fiber end, each one of said connection elements being of a staircase configuration and having a first rectilinear alignment structure for an end portion of its fiber and a second rectilinear alignment structure for a portion of the fiber adjacent the end portion, the axes of the alignment structures being in the same plane and at an angle of a few tens of degrees to each other such that when the optical fiber is held in the second rectilinear alignment structure its end portion is held in the first rectilinear alignment structure by a resilient bend of a few tens of degrees in a length of the fiber extending between the alignment structures, wherein connection is performed by superposing with their first alignment structures face to face and in alignment with the end portions of the fibers extending substantially half-way along their respective first alignment structures.

2. A device as in claim 1, wherein the end portions of the fibers are stripped and the portions of the fibers adjacent said end portions are still provided with their protective coverings.

3. A device for connecting optical fibers as in claim 1, wherein said first alignment structure is integral with a movable plate so as to align the fibers to be connected.

4. A device for connecting optical fibers as in claim 3, wherein said movable plate rests on a layer of elastomeric material which provides said moving capability.

5. A device for connecting optical fibers as in claim 3, wherein the plate which supports the alignment structure is made of silica glass.

6. A device for connecting optical fibers as in claim 3, wherein the alignment structures are made of materials selected from the group consisting of composite glasses, ceramics, ceramisable glasses, metals and materials allowing precise alignment structure capable of having tolerances of a micron.

7. A connector comprising connecting devices according to claim 3, wherein the first alignment structure of a plurality of connection elements are supported by a single plate.

8. A connector comprising connecting devices according to claim 1, and a plurality of connection devices for two fibers constituting junctions which are independent from one another.

9. A connector as in claim 8, wherein the connection devices are arranged in parallel to form modular strip bars having small bulk.

10. A method of connecting optical fibers, each of the fibers being provided with a protective covering except for a stripped end portion, comprising the steps of placing said stripped end portion of a first fiber in a first alignment structure of a connection element of a staircase configuration and a portion of said fiber provided with a protective covering adjacent said stripped end portion in a second alignment structure of said connection element, the alignment structures being in the same plane and at an angle of a few tens of degrees to each other, by bending and sliding, a bend being provided for both the stripped end portion and the adjacent portion provided with a protective covering, thus allowing said sliding, the stripped end being advanced only up to half-way along said first alignment structure, said connection elements being identical, rotating through 180° one of said elements to adjust it on the other one of said elements so as to superpose said first alignment structures, and bringing said stripped end portions of said fibers into an end to end relationship.

11. A method according to claim 10, wherein said first alignment structures are supported on elastomeric play compensating devices and the stripped end portions are put in end to end relationship by mutual pressure of said first alignment structures under the elastic pressure of said play compensating devices.

* * * * *